(12) United States Patent
Asano et al.

(10) Patent No.: US 7,118,617 B2
(45) Date of Patent: Oct. 10, 2006

(54) FIRE-PROOF TREATMENT SOLUTION AND FIRE-RETARDANT MATERIAL THEREFROM

(75) Inventors: Nariaki Asano, Fukui (JP); Hiroya Asano, Fukui (JP); Takahito Asano, Fukui (JP)

(73) Assignee: Asano Mokuzai Industry Co., Ltd., Fukui (JP)

( * ) Notice: Subject to any disclaimer, the term of this patent is extended or adjusted under 35 U.S.C. 154(b) by 67 days.

(21) Appl. No.: 10/516,166

(22) PCT Filed: May 30, 2003

(86) PCT No.: PCT/JP03/06888

§ 371 (c)(1),
(2), (4) Date: Nov. 24, 2004

(87) PCT Pub. No.: WO03/101689

PCT Pub. Date: Dec. 11, 2003

(65) Prior Publication Data
US 2005/0155733 A1     Jul. 21, 2005

(30) Foreign Application Priority Data
May 31, 2002   (JP) ............................. 2002-160755

(51) Int. Cl.
- B27K 3/52 (2006.01)
- C09K 21/00 (2006.01)
- C09K 21/12 (2006.01)

(52) U.S. Cl. ................ 106/18.13; 162/159; 428/537.1; 428/537.5; 428/921

(58) Field of Classification Search ............ 106/18.13; 162/159; 428/537.1, 537.5, 921
See application file for complete search history.

(56) References Cited

FOREIGN PATENT DOCUMENTS

| | | |
|---|---|---|
| JP | 62-248602 | 10/1987 |
| JP | 04-234603 | 8/1992 |
| JP | 10-218999 | 8/1998 |
| JP | 10-265508 | 10/1998 |

OTHER PUBLICATIONS

Derwent Abstract No. 1987-345073, abstract of Japanese Patent Specification No. JP62-248602A (Oct. 29, 1987).*
Derwent Abstract No. 1995-107137, abstract of Australian Patent Specification No. AU9468902A (Feb. 16, 1995).*

* cited by examiner

*Primary Examiner*—Anthony J. Green
(74) *Attorney, Agent, or Firm*—Flynn, Thiel, Boutell & Tanis, P.C.

(57) ABSTRACT

A fire-proof treatment solution capable of resolving problems, such as low solubility leading to low concentration and hence low combustion inhibiting effect and water solubility leading to a disadvantage of eluviation, of boron compounds used as a constituent of a flame-retarding treatment solution. In particular, a fire-proof treatment solution produced by adding phosphoric acid and a silane coupling agent to a weak acid or weak alkali aqueous metal salt solution containing a boron compound to thereby obtain a mixed aqueous solution and adding a plant extract composed mainly of a polyphenol compound to the mixed aqueous solution. This fire-proof treatment solution can be widely applied to members composed mainly of cellulose, such as wood, paper and natural fibers. This fire-proof treatment solution can increase the fixation of chemicals to thereby attain a high combustion inhibiting effect and can minimize the occurrence of eluviation.

5 Claims, 3 Drawing Sheets

FIRE-PROOF TREATMENT SOLUTION AND FIRE-RETARDANT MATERIAL THEREFROM

TECHNICAL FIELD

Field of the Invention

The present invention relates to a fire-proof treatment solution, more particularly, a fire-proof treatment solution whose main component is a boron compound for the purpose of use mainly in an easily flammable article, i.e., an article whose main component is a cellulose, such as a timber, paper, natural fiber and the like.

BACKGROUND ART

Conventional Technology

It has conventionally been accepted that timbers, papers and natural fibers, which are naturally occurring organic materials, are readily flammable.

Especially from the viewpoint of architecture, a readily flammable nature is subjected to a restriction by a law which extremely limits its use, and thus the use is poorly promoted in spite of a unique favorable property associated with a natural organic material.

On the other hand, the shortcomings mentioned above is beneficial from the viewpoint of recycling, which is attributable to an ability of being disposed of by combustion without posing any public pollution.

Accordingly, various technologies for a fire-retardant strategy of a natural organic material, i.e., flame-retardant treatment technologies, have been developed.

Currently, a combustion inhibiting effect of a flame-retardant treatment can be classified into two types, namely, a physical effect and a chemical effect, the latter being expected to be achieved by a flame-retardant treatment solution.

Such a flame-retardant treatment solution is presented in various forms such as a phosphorus compound, nitrogen compound, boron compound, halogen compound and the like.

Nevertheless, such a phosphorus compound, nitrogen compound or halogen compound produces a large amount of a toxic gas-containing fume upon combustion, while phosphoric acid may cause a problematic deterioration or discoloration of the material.

On the other hand, a boron compound does not produce any toxic gas attributable to a pyrolytic product upon combustion, and causes a relatively slight deterioration or discoloration of the material.

In addition, it has a preserving and ant-repelling effect, and allows its target material to be a high value-added material.

An agent whose main component is a boron compound exhibits a high heat formation-suppressing performance due to its dehydrating calcination effect.

The term dehydrating calcinations effect means an ability of the agent to form an acid or base upon heating whereby dehydrating cellulose at a low temperature within a short period to yield water and carbon.

Thus, this combustion inhibiting effect consists of two effects, namely, a water evaporation-induced endothermic effect and a reduction of the exothermic rate due to the formation of a carbon residue whose combustion rate is low.

(Problems to be Solved by the Invention)

However, the use of a boron compound as a flame-retardant treatment solution poses the following two problems to be solved:

1) the solubility is low and the combustion inhibiting effect is reduced at a low concentration; and, 2) an eluviation occurs due to the solubility in water.

The present invention is intended to solve these problems by providing a fire-retardant treatment solution having a high combustion inhibiting effect while avoiding the eluviation as far as possible.

DISCLOSURE OF THE INVENTION

Means for Solving the Problem

The inventors made an effort under the background described above and finally discovered that the solubility is improved in the presence of a metal salt, that a silane coupling agent allows for a film-forming behavior, and that the eluviation can be suppressed by a polyphenolic substance, thereby accomplishing the invention.

Thus, the present invention is (1) a fire-proof treatment solution obtained by adding a phosphoric acid and a silane coupling agent to a weakly acidic or weakly alkaline metal salt aqueous solution containing a boron compound to form a mixed aqueous solution and adding to said mixed aqueous solution a plant extract whose main component is a polyphenolic compound.

It is also (2) a fire-retardant treatment solution wherein the weakly acidic or weakly alkaline metal salt is contained in an amount of 1 to 10% by weight based on the total weight of all components.

It is also (3) a fire-retardant treatment solution wherein the boron compound is contained in an amount of 50 to 95% by weight based on the total weight of all components.

It is also (4) a fire-retardant treatment solution wherein the phosphoric acid is contained in an amount of 1 to 10% by weight based on the total weight of all components.

It is also (5) a fire-retardant treatment solution wherein the silane coupling agent is contained in an amount of 0.1 to 5% by weight based on the total weight of all components.

It is also (6) a fire-retardant treatment solution wherein the plant extract whose main component is a polyphenolic compound is contained in an amount of 0.5 to 40% by weight based on the total weight of all components.

It is also (7) a fire-retardant material obtained by adding a fire-retardant treatment solution described above to an article whose main component is cellulose.

It is also (8) a fire-retardant material obtained by impregnating a timber with a fire-retardant treatment solution described above.

It is also (9) a fire-retardant material obtained by impregnating a paper with a fire-retardant treatment solution described above.

It is also (10) a fire-retardant material obtained by impregnating a fiber with a fire-retardant treatment solution described above.

The present invention may also be a combination of two or more of (1) to (10) described above, as long as its purpose is attained.

(Advantageous Effect of the Invention)

According to the fire-retardant treatment solution of the present invention, the fixation of an agent is improved to enhance the combustion inhibiting effect while suppressing the eluviation as far as possible.

As a result, a fire-retardant timber can be provided.

Moreover, such a fire-retardant treatment solution can widely be applied to an article whose main component is cellulose, such as a timber, paper, natural fiber and the like.

BEST MODE FOR CARRYING OUT THE INVENTION

Figure 1:
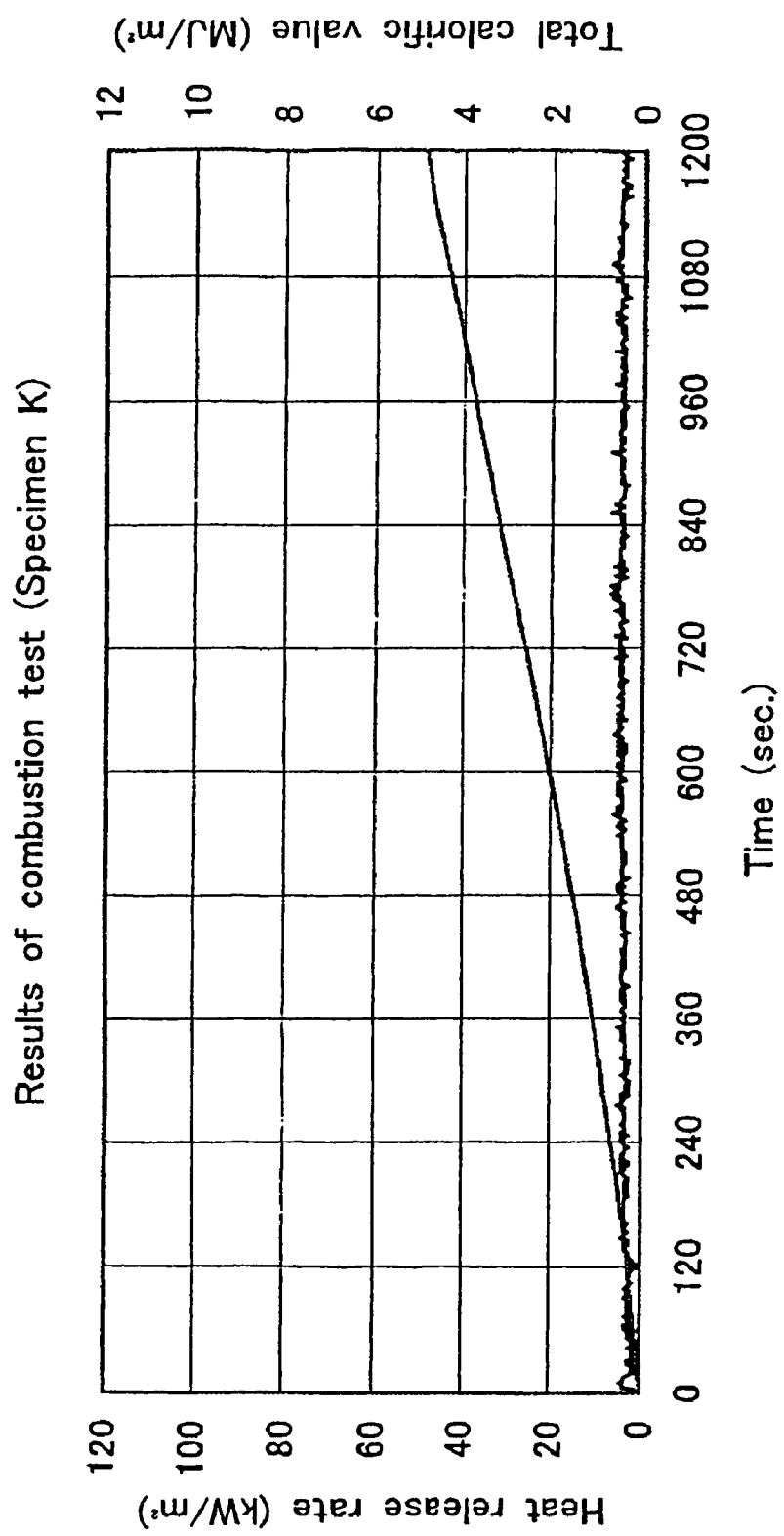
FIG. 1 is a graph showing the results of a combustion test of a test article (K).

A fire-retardant treatment solution of the present invention is obtained by adding a phosphoric acid and a silane coupling agent to a weakly acidic or weakly alkaline metal salt aqueous solution containing a boron compound to form a mixed aqueous solution and adding to said mixed aqueous solution a plant extract whose main component is a polyphenolic compound.

As a result, an impregnation of a material leads to an extreme improvement in terms of a combustion inhibiting effect and an eluviation inhibiting effect.

A material to be impregnated or applied is mainly an article whose main component is cellulose, such as a timber, paper, natural fiber and the like.

(Combustion Inhibiting Effect)

Since a boron compound itself exhibits a low solubility as is well known, a solution of the boron compound at a high concentration is required for an efficient penetration into a material.

Accordingly, in the present invention, the solubility is improved by a catalytic effect of a weakly acidic or weakly alkaline metal salt.

Such a weakly acidic or weakly alkaline metal salt used here is sodium fluoride, sodium phosphate, sodium sulfite, sodium borofluoride and the like.

The weakly acidic or weakly alkaline metal salt content is 1 to 10% by weight based on the total weight of all components.

Content less than 1% leads to a difficulty in dissolution of the boron compound, while that exceeding 10% is not efficient in terms of the producibility.

The total weight of all components as used herein means the total weight of each component, which is a fire-retardant treatment solution except for water.

Since said boron compound, when used alone, undergoes a conversion into a powder after drying, its crystallinity should be changed by using a phosphoric acid and a silane coupling agent, which serves to impart the dried material with a film-forming ability.

As a result, the amount of the agent fixed in the material is increased, and an improved fixation is achieved, whereby obtaining an improved combustion inhibiting effect.

As a silane coupling agent, a representative includes ethoxysilane, methoxysilane and the like, and the experimentation employs those supplied by Shin-Etsu Chemical Co., Ltd., such as, for the example products names of KBM-602, KBM-603, KBE-603, KBM-903, KBE-903, KBE-04, KBM-13, KBM-22, KBE-22, LBE-103, KPN-3504, KBM-3063, KBM-3103C and the like.

The silane coupling agent content is 0.1 to 5% by weight based on the total weight of all components.

Content less than 0.1% leads to a difficulty in imparting a film-forming ability, while that exceeding 5% leads to an increased viscosity of the solution which results in a difficulty in treating a material.

(Eluviation Inhibiting Effect)

It is also required to inhibit the eluviation of an agent (fire-retardant treatment solution) in a wet state.

In the present invention, the eluviation level of an agent is reduced by using a polyphenolic substance which is a component of a bark extract.

The reasons why a polyphenolic compound is used are the intention to achieve a chemical reaction which makes a boron compound hardly water-soluble after drying the material as a result of the adsorption of the boron compound by the polyphenolic compound.

Such a chemical reaction is supported by Example 3 described below.

A polyphenolic compound used may be purified tannin or tannin which is a component of a bark extract obtained for example by extracting a cedar bark with water for 24 hours.

The polyphenolic compound content is 0.5 to 40% based on the total weight of all components.

A content of less than 0.5% leads to a poor effect, while that exceeding 40% leads to a possibility rather of a reduction in the amount of a boron compound fixed.

The incorporation of a polyphenolic compound tends to raise the temperature at which the solid components in the agent are precipitated.

When applying such an agent to a material, two methods may be employed.

In the first method, after impregnation with a polyphenolic compound followed by drying, the material is impregnated with a boron compound.

In the second method, a boron compound and a polyphenolic compound are mixed in a solution, whose temperature is raised and maintained within a range causing no precipitation, whereby effecting a fixation inside the material.

In the present invention, the latter is employed in view of the fixation efficiency.

The present invention is further described in the following Examples which are not intended to restrict the invention, and various modifications can be made.

EXAMPLE 1

(I) Validation of Drug Fixation Rate Upon Drying Article

First, a metal salt aqueous solution containing a boron compound was combined with a phosphoric acid and a silane coupling agent [methoxysilane (KBM-22)] to form an aqueous solution mixture.

To this aqueous solution mixture, a tannin, as a plant extract whose main component is a polyphenolic compound, was incorporated to yield a treatment solution 1 (corresponding to a fire-retardant treatment solution).

On the other hand, a treatment solution 2 was prepared similarly to the treatment solution 1 except for adding no tannin.

The amount (% by weight) of each component in the treatment solution 1 and the treatment solution 2 is indicated in Table 1 shown below.

In the treatment solution 1 shown in Table 1, a test article made from a timber (A, B, C, D, E) was immersed for 3 hours while heating and maintaining at an elevated temperature, whereby effecting an impregnation.

After the impregnation followed by drying, the weight (weight before eluviation) and the water content were measured.

The test article used herein was a timber piece having the size of 20 cm×12 cm×5 cm.

Subsequently, each test article (A, B, C, D, E) was allowed to stand for three days under a highly humid condition whose dry bulb temperature was 65° C. and whose relative humidity was 90%.

This condition employed the settings which allow the eluviation to occur readily.

A complete drying was accomplished at a constant temperature of 105° C., and the weight (post-eluviation post drying weight) was measured.

The eluviation levels of 5 test articles (A, B, C, D, E) are as shown in Table 2 shown below.

Then, a test article of a timber piece of 20 cm×12 cm 5 cm (F, G, H, I, J) was provided, and treated with the treatment solution 2 similarly to the test articles described above (A, B, C, D, E), weighed and examined for the water content.

The eluviation levels of 5 test articles (F, G, H, I, J) are as shown in Table 3 shown below.

As evident from Tables 2 and 3, the eluviation level was reduced markedly when using the treatment solution 1 when compared with the treatment solution 2.

Accordingly, the use of a polyphenolic compound allows a sufficient agent eluviation inhibiting effect to be exerted.

While the amount of the polyphenolic compound in the treatment solution 1 was about 1% based on the entire treatment solution, it may be increased for the purpose of further improving the agent eluviation inhibiting effect.

EXAMPLE 2

(II) Validation of Combustion Inhibiting Effect

First, a metal salt aqueous solution containing a boron compound was combined with a phosphoric acid and a silane coupling agent [methoxysilane (KBM-22)] to form an aqueous solution mixture.

To this aqueous solution mixture, tannin, as a plant extract whose main component is a polyphenolic compound, was incorporated to yield a treatment solution 3.

On the other hand, a treatment solution 4 was prepared similarly to the treatment solution 3 except for not adding a silane coupling agent (KBM-22).

The blending ratio (% by weight) of each component in the treatment solution 3 and the treatment solution 4 is indicated in Table 4 shown below.

In this Example, a test article made from a timber was impregnated with the treatment solution 3 shown in Table 4, and the test article (K) was examined using an ISO cone calorie meter.

After a similar impregnation with the treatment solution 4, the test article (L) was examined similarly.

FIG. 1 is a graph showing the results of a combustion test of the test article (K).

These results indicate superiority to the standard performance of a fire-retardant material prescribed in Construction Standard Act.

Figure 2:
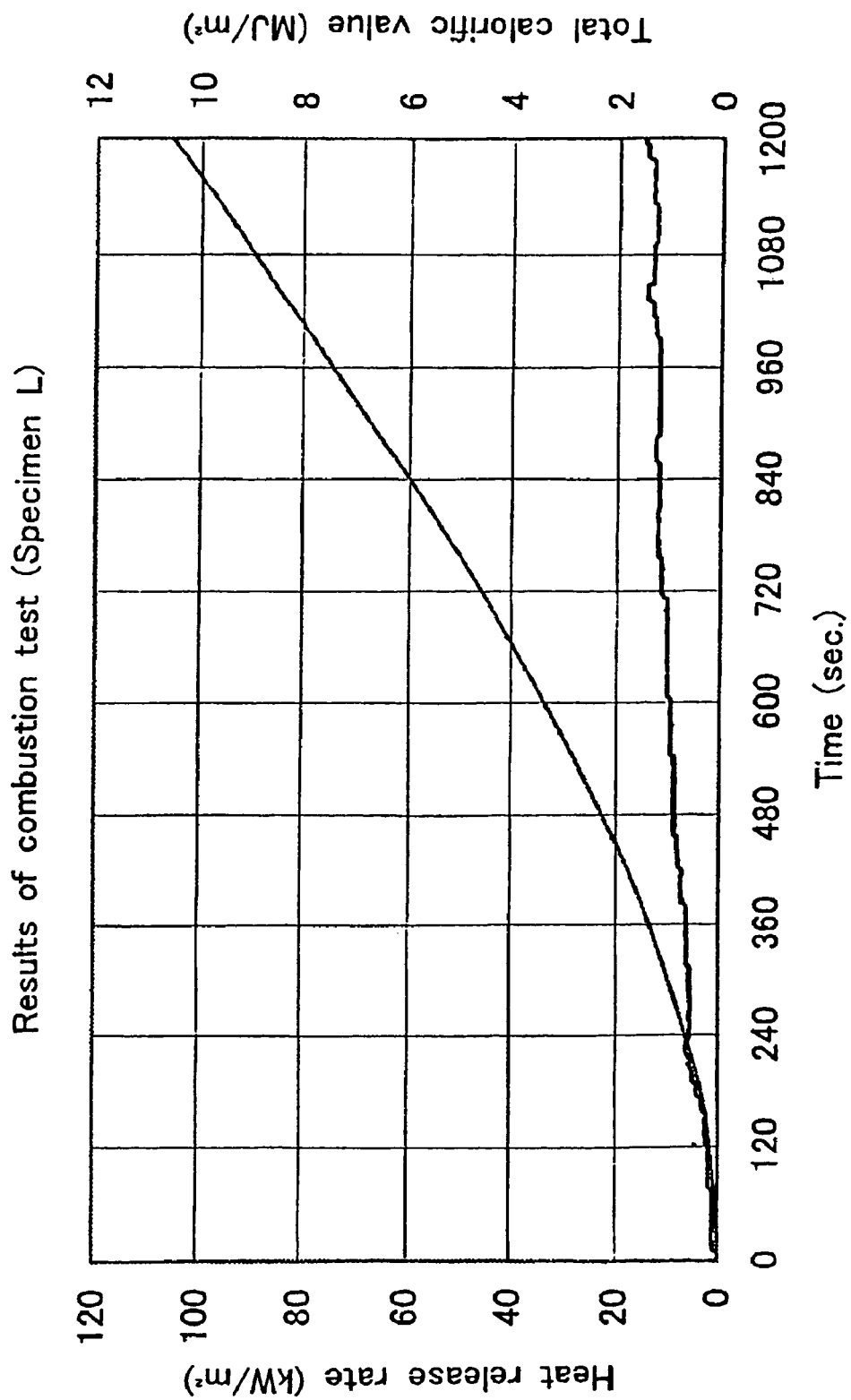
FIG. 2 is a graph showing the results of a combustion test of a test article (L).

FIG. 2 is a graph showing the results of a combustion test of the test article (L).

These results indicate compliance with the standard performance of a quasi fire-retardant material prescribed in Construction Standard Act, but not with the standard performance of a fire-retardant material.

Thus, by incorporating a silane coupling agent in a certain amount, a fire-retardant material under the Construction Standard Art can be realized.

EXAMPLE 3

A treatment solution similar to the treatment solution 1 shown in Table 1 except for using a catechin instead of the tannin was provided.

This treatment solution was subjected to a $^{13}$C-NMR spectroscopy.

In this case, the catechin (polyphenolic compound) which is a precursor of tannin was used instead of the tannin because it can readily be analyzed for a $^{13}$C-NMR spectrum.

Figure 3:
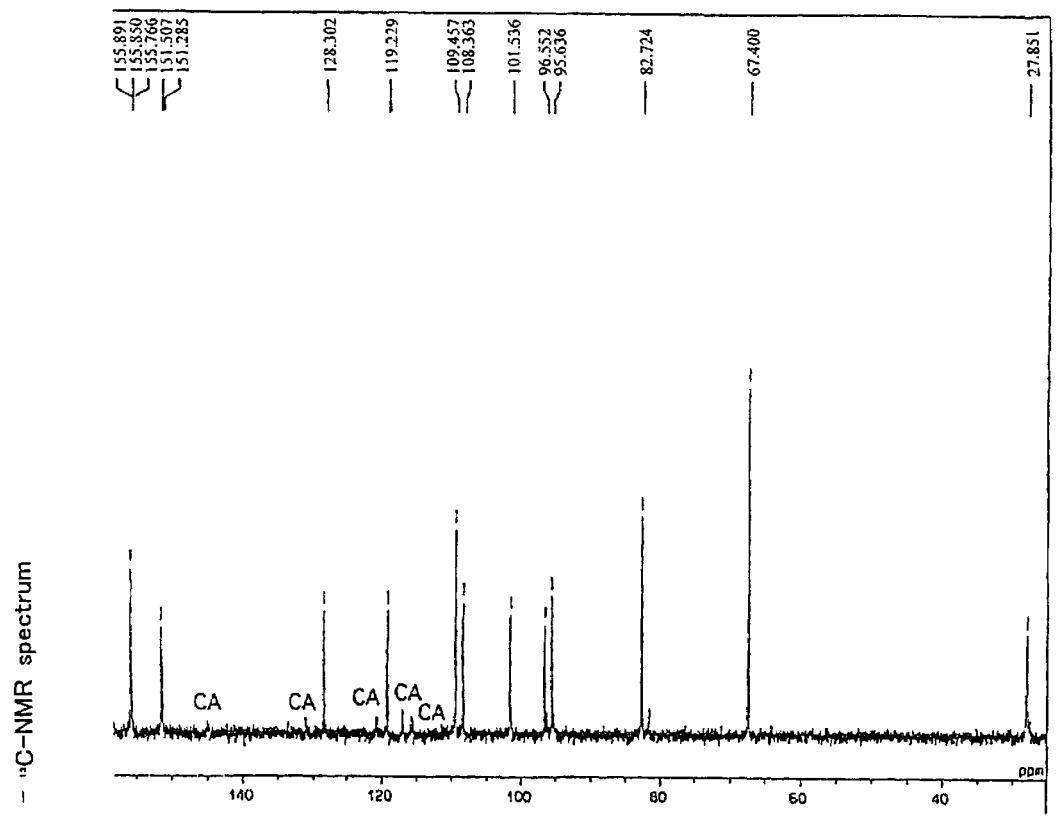
FIG. 3 shows the results of a $^{13}$C-NMR spectroscopy.

FIG. 3 shows the results of a $^{13}$C-NMR spectroscopy.

Since the peak attributable to the catechin was reduced in this figure, the catechin was considered to interact with other components in the treatment solution, thereby effecting a chemical change in the catechin.

INDUSTRIAL APPLICABILITY, UTILITY

While the present invention relates to a fire-proof treatment solution, and more particularly, it is employed mainly in an easily flammable article, i.e., an article whose main component is a cellulose, such as a timber, paper, natural fiber and the like, it can be applied also to interior wall paper, furniture, clothing materials and the like, with a similar effect being expected as long as there is no deviation from the principle.

TABLE 1

| | Treatment solution 1 (Formulation 1) (%) | Treatment solution 2 (Formulation 2) (%) |
| --- | --- | --- |
| Water | 80.00 | 80.00 |
| Weakly acidic/ Weakly alkaline metal salt | 0.80 | 0.80 |
| Borax | 10.60 | 11.64 |
| Boric acid | 6.80 | 6.80 |
| Phosphoric acid | 0.66 | 0.66 |
| KBM-22 | 0.10 | 0.10 |
| Tannin | 1.04 | 0.00 |
| Total | 100.0 | 100.0 |

TABLE 2

[Eluviation level (with tannin)]

| Test article number | Pre-eluviation weight (%) | Pre-eluviation water content (g) | Pre-eluviation post-drying weight (g) | Pre-eluviation agent level (g) | Post-eluviation post-drying weight (g) | Agent eluviation level (g) | Agent eluviation level/Pre-eluviation agent level |
|---|---|---|---|---|---|---|---|
| A | 744 | 7.20 | 694.03 | 347.23 | 564.94 | 129.09 | 0.37 |
| B | 732 | 6.70 | 686.04 | 344.04 | 563.92 | 122.11 | 0.35 |
| C | 743 | 7.50 | 691.16 | 349.16 | 559.15 | 132.01 | 0.38 |
| D | 727 | 7.00 | 679.44 | 339.84 | 554.42 | 125.02 | 0.37 |
| E | 740 | 7.70 | 687.09 | 349.89 | 556.55 | 130.55 | 0.37 |

TABLE 3

[Eluviation level (without tannin)]

| Test article number | Pre-eluviation weight (%) | Pre-eluviation water content (g) | Pre-eluviation post-drying weight (g) | Pre-eluviation agent level (g) | Post-eluviation post-drying weight (g) | Agent eluviation level (g) | Agent eluviation level/Pre-eluviation agent level |
|---|---|---|---|---|---|---|---|
| F | 767 | 7.60 | 712.83 | 373.23 | 559.57 | 153.26 | 0.41 |
| G | 755 | 7.90 | 699.72 | 354.12 | 552.78 | 146.94 | 0.41 |
| H | 741 | 7.40 | 689.94 | 346.74 | 553.34 | 136.61 | 0.39 |
| I | 745 | 7.50 | 693.02 | 345.02 | 557.19 | 135.83 | 0.39 |
| J | 761 | 7.40 | 708.57 | 371.37 | 561.18 | 147.38 | 0.40 |

TABLE 4

|  | Treatment solution 3 (Formulation 3) (%) | Treatment solution 4 (Formulation 4) (%) |
|---|---|---|
| Water | 80.00 | 80.00 |
| Weakly acidic/Weakly alkaline metal salt | 0.80 | 0.80 |
| Borax | 10.60 | 10.70 |
| Boric acid | 6.80 | 6.80 |
| Phosphoric acid | 0.66 | 0.66 |
| KBM-22 | 0.10 | 0.00 |
| Tannin | 1.04 | 1.04 |
| Total | 100.0 | 100.0 |

The invention claimed is:

1. A fire-retardant treatment solution obtained by adding 1–10 wt. % of phosphoric acid and 0.1–5 wt. % of a silane coupling agent to an aqueous solution containing 1–10 wt. % of an acidic or alkaline metal salt and 50–95 wt. % of a boron compound to form a mixed aqueous solution and adding to said mixed aqueous solution 0.5–40 wt. % of a polyphenolic compound.

2. A fire-retardant material obtained by adding a fire-retardant treatment solution according to claim 1 to an article whose main component is a cellulose.

3. A fire-retardant material obtained by impregnating a timber with a fire-retardant treatment solution according to claim 1.

4. A fire-retardant material obtained by impregnating a paper with a fire-retardant treatment solution according to claim 1.

5. A fire-retardant material obtained by impregnating a fiber with a fire-retardant treatment solution according to claim 1.

* * * * *